(12) United States Patent
Charif et al.

(10) Patent No.: US 9,530,113 B2
(45) Date of Patent: Dec. 27, 2016

(54) BUSINESS PROCESS BEHAVIOR CONFORMANCE CHECKING AND DIAGNOSTIC METHOD AND SYSTEM BASED ON THEORETICAL AND EMPIRICAL PROCESS MODELS BUILT USING PROBABILISTIC MODELS AND FUZZY LOGIC

(71) Applicant: XEROX CORPORATION, Norwalk, CT (US)

(72) Inventors: Yasmine Charif, Rochester, NY (US); Julien Bourdaillet, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 690 days.

(21) Appl. No.: 14/017,861

(22) Filed: Sep. 4, 2013

(65) Prior Publication Data

US 2015/0066816 A1    Mar. 5, 2015

(51) Int. Cl.
    G06Q 10/06      (2012.01)
    G06N 5/02       (2006.01)
    G06N 99/00      (2010.01)

(52) U.S. Cl.
    CPC .............. G06Q 10/067 (2013.01); G06N 5/02 (2013.01); G06N 99/005 (2013.01); G06Q 10/0633 (2013.01); G06Q 10/0637 (2013.01); G06Q 10/0639 (2013.01)

(58) Field of Classification Search
    None
    See application file for complete search history.

(56) References Cited

U.S. PATENT DOCUMENTS

| 7,673,261 | B2 | 3/2010 | Adir et al. | |
|---|---|---|---|---|
| 2009/0089741 | A1* | 4/2009 | Bornhoevd | G06F 8/34 717/106 |
| 2012/0066166 | A1* | 3/2012 | Curbera | G06N 7/005 706/52 |
| 2012/0101974 | A1* | 4/2012 | Duan | G06N 5/048 706/52 |
| 2012/0259792 | A1* | 10/2012 | Duan | G06Q 10/06 705/348 |

(Continued)

FOREIGN PATENT DOCUMENTS

| EP | 2107514 A1 | 7/2009 |
|---|---|---|
| WO | 2004034304 A2 | 4/2004 |

OTHER PUBLICATIONS

Ferreira et al, Discovering Process Models from Unlabelled Event Logs, 2009.*

(Continued)

Primary Examiner — Stanley K Hill
Assistant Examiner — Mikayla Chubb
(74) Attorney, Agent, or Firm — MH2 Technology Law Group LLP

(57) ABSTRACT

The present invention generally relates to systems and methods for checking the conformance of a process behavior against a theoretical process model, and for further providing a detailed diagnostic regarding the process behavior's expectedness and frequency. The provision of this detailed diagnostic includes discovering the empirical models generated by the system's business processes, and matching the defined process model to its corresponding empirical model.

17 Claims, 11 Drawing Sheets

(56) References Cited

U.S. PATENT DOCUMENTS

| | | | |
|---|---|---|---|
| 2013/0035697 A1 | 2/2013 | Buffet | |
| 2013/0110576 A1* | 5/2013 | Roy | G06Q 10/06 705/7.26 |
| 2014/0047445 A1* | 2/2014 | Roy | G06F 9/46 718/100 |
| 2014/0164050 A1* | 6/2014 | Jojgov | G06Q 10/0633 705/7.27 |
| 2014/0279769 A1* | 9/2014 | Goodwin | G06N 5/022 706/14 |

OTHER PUBLICATIONS

Gunther et al, Fuzzy Mining—Adaptive Process Simplification Based on Multi-perspective Metrics, 2007.*

Weber et al, A Principled Approach to Mining from Noisy Logs Using Heuristics Miner, 2013.*

Yzquierdo-Herrera et al, Sub-process Discovery: Opportunities for Process Diagnostics, 2013.*

* cited by examiner

US 9,530,113 B2

BUSINESS PROCESS BEHAVIOR CONFORMANCE CHECKING AND DIAGNOSTIC METHOD AND SYSTEM BASED ON THEORETICAL AND EMPIRICAL PROCESS MODELS BUILT USING PROBABILISTIC MODELS AND FUZZY LOGIC

FIELD OF THE INVENTION

This invention relates generally to process conformance evaluation.

SUMMARY

According to various embodiments, a computer-implemented method for business process behavior conformance checking is presented. The method includes obtaining a plurality of electronically-stored empirical process models, each empirical process model reflecting at least one of a plurality of logs, obtaining a plurality of electronically-stored theoretical process models, matching each empirical process model to a theoretical process model, obtaining a log for a particular process instance, where activities in the log for the particular process instance are unlabeled, identifying activity labels for the particular process instance, matching the log for the particular process instance to a particular empirical process model, determining a particular theoretical process model that matches the particular empirical process model, computing, using at least one of the particular empirical process model and the particular theoretical process model, a diagnostic for the log for the particular process instance using an electronic processor, and outputting in human readable form the diagnostic.

Various optional features of the above embodiments include the following. The diagnostic can include at least one of a behavior expectedness and a behavior frequency. The behavior expectedness can include a fitness score. The behavior frequency can include a mean of transition probabilities. The diagnostic can include a qualitative diagnostic. The method can further include taking an action based on the quantitative diagnostic, where the action includes at least one of: validating the particular theoretical process model, publishing the particular theoretical process model, correcting the particular theoretical process model, and improving the particular theoretical process model. The matching can include: generating an empirical transition matrix for each empirical process model, generating a theoretical transition matrix for each theoretical process model, and determining a decision matrix for each pair consisting of an empirical transition matrix and a theoretical transition matrix. The determining a decision matrix can include calculating a plurality of fuzzy NOT XOR values. The method can further include computing a score for each decision matrix, where the matching each empirical process model to a theoretical process model comprises determining, for each empirical process model, a theoretical process model for which an associated decision matrix has a highest score. The obtaining a plurality of electronically stored empirical process models, each empirical process model reflecting at least one of a plurality of logs, includes: obtaining logs for the plurality of process instances, and generating a plurality of empirical process models from the logs.

According to various embodiments, a system including at least one electronic processor is presented. The at least one electronic processor is configured to obtain a plurality of electronically-stored empirical process models, each empirical process model reflecting at least one of a plurality of logs, obtain a plurality of electronically-stored theoretical process models, match each empirical process model to a theoretical process model, obtain a log for a particular process instance, where activities in the log for the particular process instance are unlabeled, identify activity labels for the particular process instance, match the log for the particular process instance to a particular empirical process model, determine a particular theoretical process model that matches the particular empirical process model, compute, using at least one of the particular empirical process model and the particular theoretical process model, a diagnostic for the log for the particular process instance using an electronic processor, and output in human readable form the diagnostic.

Various optional features of the above embodiments include the following. The diagnostic can include at least one of a behavior expectedness and a behavior frequency. The behavior expectedness can include a fitness score. The behavior frequency can include a mean of transition probabilities. The diagnostic can include a qualitative diagnostic. The at least one electronic processor can be further configured to take an action based on the quantitative diagnostic, where the action includes at least one of: validating the particular theoretical process model, publishing the particular theoretical process model, correcting the particular theoretical process model, and improving the particular theoretical process model. The at least one electronic processor can be further configured to: generate an empirical transition matrix for each empirical process model, generate a theoretical transition matrix for each theoretical process model, and determine a decision matrix for each pair consisting of an empirical transition matrix and a theoretical transition matrix. The at least one electronic processor can be further configured to determine a decision matrix by calculating a plurality of fuzzy NOT XOR values. The at least one electronic processor can be further configured to compute a score for each decision matrix, and determine, for each empirical process model, a theoretical process model for which an associated decision matrix has a highest score. The at least one electronic processor configured to obtain a plurality of empirical process models, each empirical process model reflecting at least one of a plurality of log, can be further configured to: obtain logs for the plurality of process instances, and generate a plurality of empirical process models from the logs.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Business processes can define the orchestration of automated services, human activities, and machines' operations, for example. Related data and events can be recorded in the form of logs that are scattered across many tables, files, and logging systems, e.g. Service-Oriented Architecture (SOA) runtime, business process management systems, etc. For example, classical business process management systems (BPMS), e.g. SMARTBPM by PEGASYSTEMS, enterprise resource planning (ERP), e.g. SAP BUSINESS SUITE, customer relationship management (CRM), e.g. SALESFORCE, middleware, e.g. IBM's WEBSPHERE, and hospital systems, e.g., SIEMENS' SOARIAN, log detailed information about business activities executed in the context of an organization's business processes.

Monitoring an organization's business activities can provide real-time information about the status and results of various operations, processes, and transactions. For example, the 2003 North America blackout was triggered when a local outage was not detected by monitoring software. Therefore, benefits can be obtained through techniques that allow an enterprise to make better-informed business decisions, quickly address problem areas, and re-position organizations to take full advantage of emerging opportunities. Process mining and business activity monitoring are fields that propose such process optimization techniques.

Figure 1:
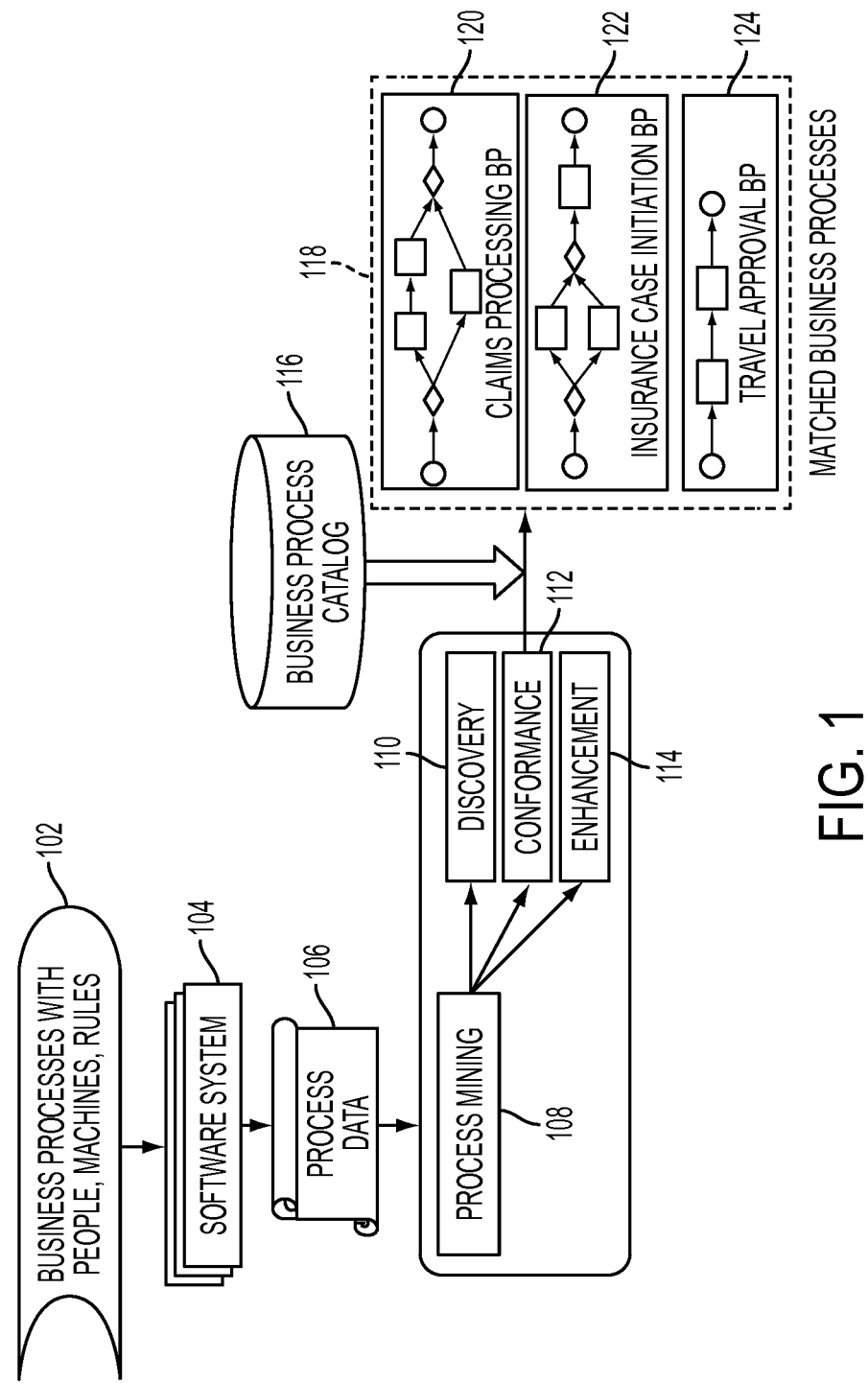
FIG. 1 is a schematic diagram providing context for some embodiments.
Figure 2A:
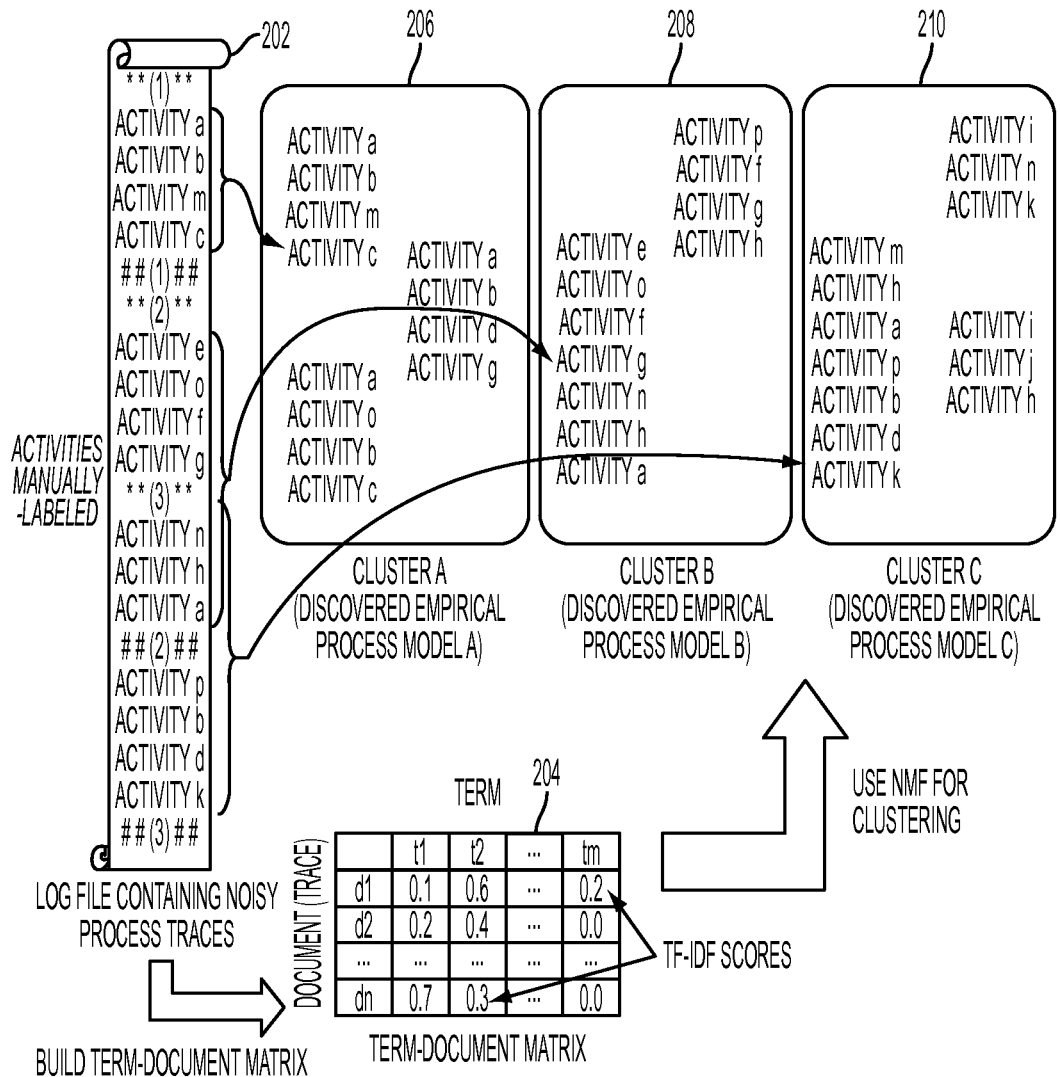
FIGS. 2A and 2B are schematic diagrams of a technique for discovering empirical process models according to some embodiments.
Figure 2B:
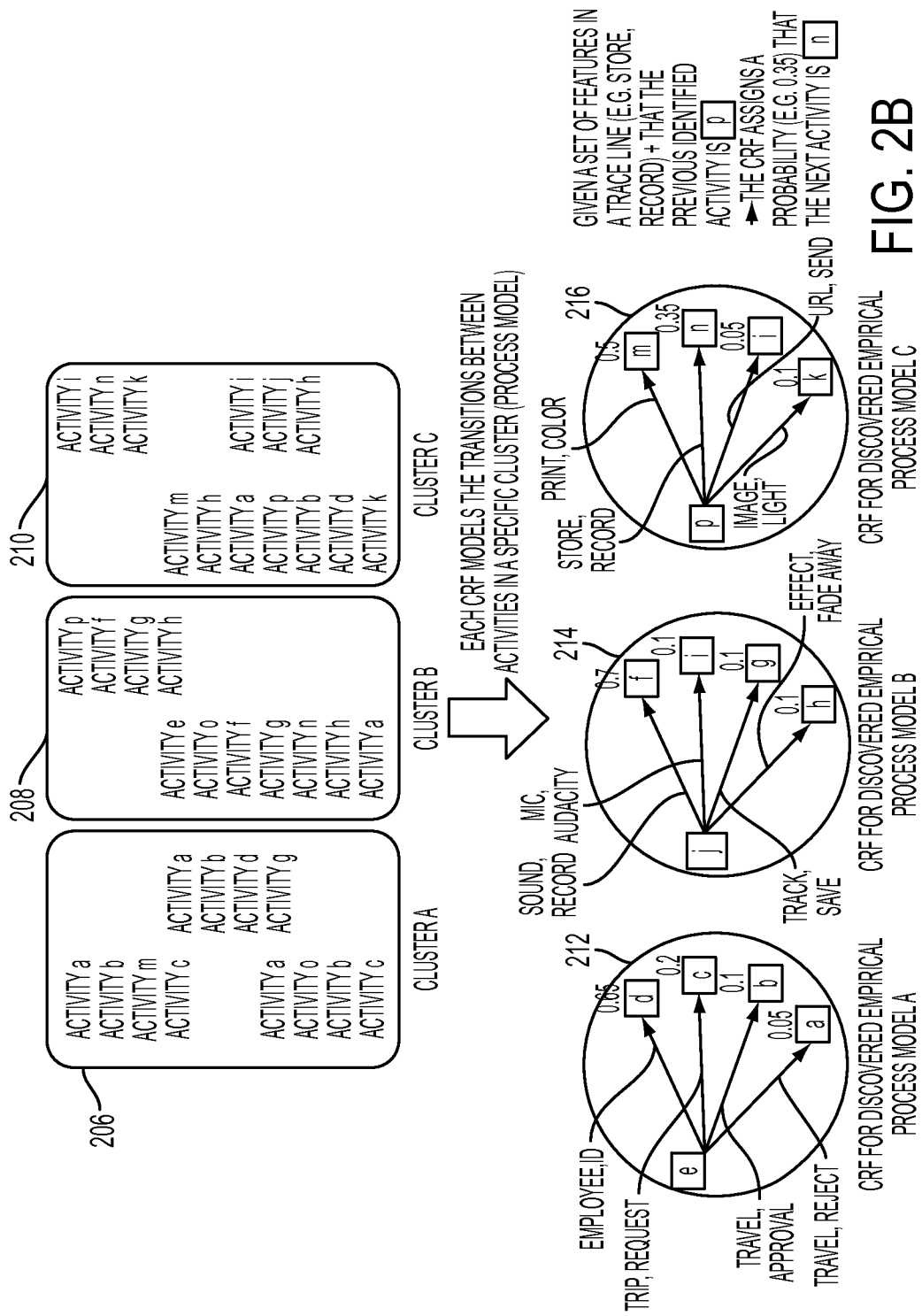
Figure 3:
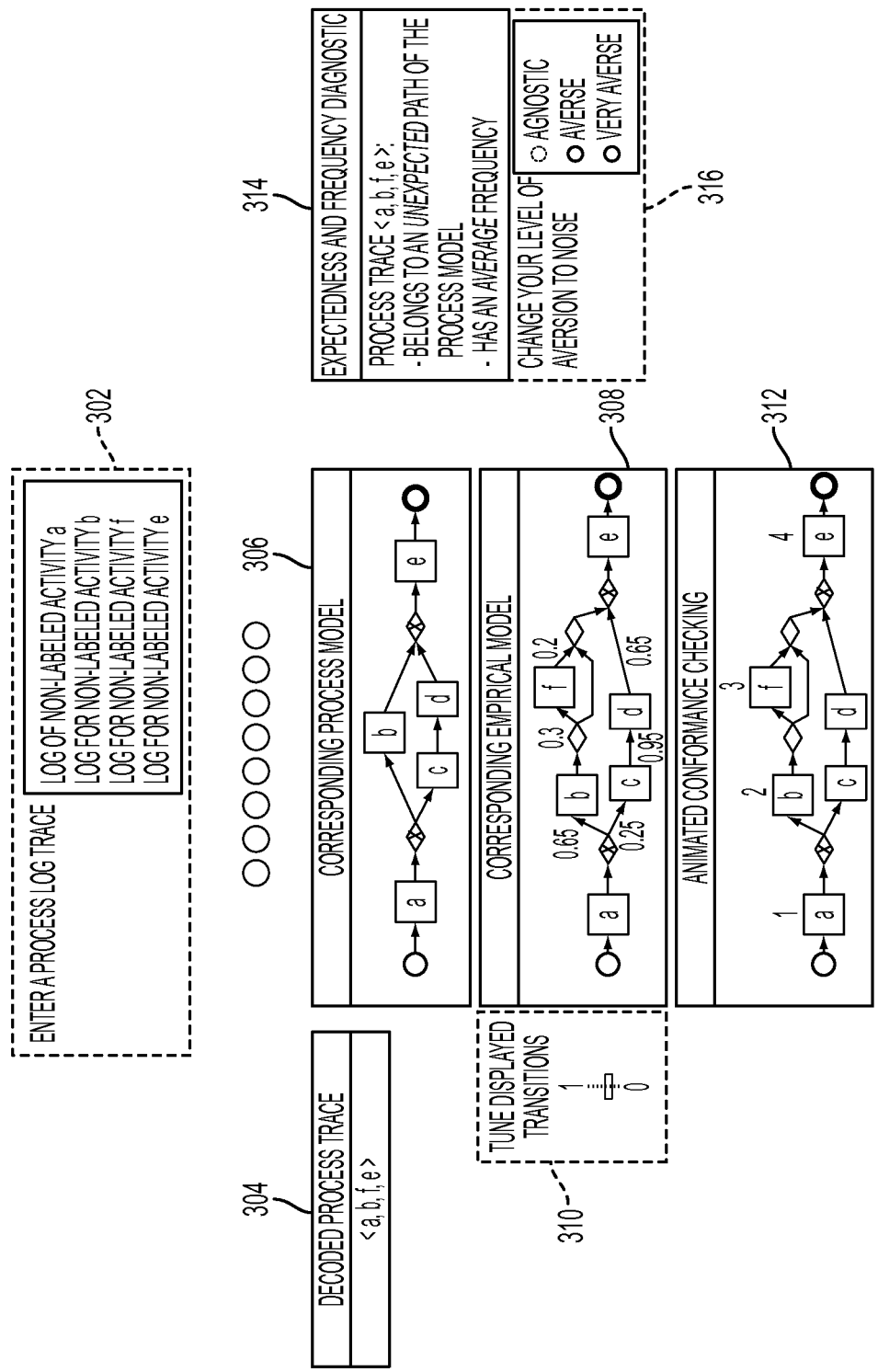
FIG. 3 is a schematic diagram of a visualization of a technique for decoding a process trace, displaying its matching theoretical and empirical process models, checking its conformance, and diagnosing its expectedness and frequency according to some embodiments.

In what follows, an overview is presented in the context of FIGS. 1-3. Details of specific embodiments are presented in the context of FIGS. 4-10.

FIG. 1 is a schematic diagram providing context for some embodiments. In particular, FIG. 1 depicts three purposes for mining process logs. Thus, business processes with people, machines, rules, etc. 102 are realized by software system 104, which produces process data 106. Process data 106 is amenable to process mining 108, which can be used for discovery 110, conformance 112, or enhancement 114, as discussed below.

"Discovery" 110 includes taking a process log and producing a process model without using any a-priori information. Process discovery can be used to rebuild processes that are taking place without relying on any catalog of process models.

"Conformance checking" 112 includes comparing an existing process model with a process log for the same process. It can be used to check if reality, as recorded in the log, conforms to the process model, and vice versa, e.g. checking if two IDs have been provided every time an amount superior to $5K has been checked. It can be used to detect, locate, explain deviations, and to measure the severity of these deviations. Conformance checking can utilize, for example, business process catalog 116, which includes formal descriptions of business processes. Conformance checking can be used to verify adherence to formal business processes for claims processing 120, insurance case initiation 122, or travel approval 124, as specific, non-limiting examples.

"Enhancement" 114 includes extending or improving an existing process model using information about the actual process recorded in some process log. Whereas conformance checking measures the alignment between model and reality, enhancement aims at changing or extending the a-priori model, e.g. changing the sequential execution of two activities in a model into parallel.

In this context, embodiments can provide a conformance checking method and system that includes, for example, a diagnostic on the expectedness of a process trace when conformed to a process model, a diagnostic on its frequency range within this behavior, and a tunable visualization that adapts to the level of the user's aversion to noise.

The following terms are used in the present document. A "Process model" can be a representation of the control flow of a set of activities/services. It can be formalized in languages such as BPMN 2.0 [BPMN 2.0], Petri Nets, Causal Nets, etc. A "process instance" can be one possible execution of a process model, e.g., through the reception of a triggering event, and the instantiation of the process model's activities. A "trace" can be a collection of activity log entries that have been generated by the same process instance. A "log" can be a collection of traces. "Noise" can be present in: a) the occurrence of logs of exceptional/rare activities in a trace, b) interleaving process instance traces, and/or c) incomplete traces.

Embodiments can thus provide a method and system that allow for better measuring the nature and severity of a process' deviation while conformance checking is performed on a process trace and a process model. The detailed diagnostics provided by embodiments pertain to the expectedness and frequency of a process behavior. They implement conformance checking of a process trace with both the theoretical model, extracted from the process model, and an empirical model, which can be characterized by a discovered probabilistic model with transition probabilities information learnt from usage data.

Embodiments can be characterized by two phases. The first phrase can be referred to as an "offline phase", which can discover empirical models, build theoretical models from process models, and match the two sets. FIGS. 2A and 2B provide an overview of the offline phase. The second phase can be referred to as an "online phase", which, given a process trace, can establish its behavior diagnostic and provide a tunable visualization. FIG. 3 provides an overview of both the offline and online phases; that is, FIG. 3 provides a brief overview of some embodiments.

FIGS. 2A and 2B are schematic diagrams of a technique for discovering empirical process models according to some embodiments. In particular, the techniques discussed in reference to FIGS. 2A and 2B can use non-negative matrix ("NMF") factorization for clustering and conditional random field ("CRF") models for probabilistic modeling. The process of FIGS. 2A and 2B can include mining noisy process logs (e.g., interleaving and/or incomplete process traces with the occurrence of rare or exceptional activity logs) in order to build probabilistic models (e.g., CRF), each of which models a discovered process model that generated the logs. Existing techniques for the process of FIGS. 2A and 2B can be utilized in embodiments. Alternately, techniques disclosed and claimed in U.S. patent application Ser. No. 14/081,203, entitled, "A METHOD AND SYSTEM FOR CLUSTERING, MODELING, AND VISUALIZING PROCESS MODELS FROM NOISY LOGS" to Charif et al., filed Nov. 15, 2013 and corresponding to Xerox invention can be used. The aforementioned application is hereby incorporated by reference herein in its entirety.

The input to the process of FIGS. 2A and 2B generally includes noisy logs 202 of multiple executed business process instances. The activities in logs 202 are manually labeled and used to build term-document matrix 204. The algorithm can include clustering similar log traces using NMF. Each cluster 206, 208, 210 encloses the traces corresponding to one discovered process model. The process also learns a CRF 212, 214, 216 for each cluster 206, 208, 210, respectively. Each CRF 212, 214, 216 corresponds to a probabilistic empirical model of the referred discovered process model.

The output of the process of FIGS. 2A and 2B generally includes K CRFs 212, 214, 216. Each CRF 212, 214, 216 models transition probabilities between activities of one discovered process model (empirical model). (As used herein, CRF transition matrices are referred to as the "empirical transition matrices".) Each CRF 212, 214, 216 can be used to generate a probabilistic model for each cluster. The process of FIGS. 2A and 2B thus provide discovered probabilistic process model representations. As used throughout, such discovered process models can be referred to as "empirical process models".

FIG. 3 is a schematic diagram of a visualization of a technique for decoding a process trace, displaying its matching theoretical and empirical process models, checking its conformance, and diagnosing its expectedness and frequency according to some embodiments. Thus, FIG. 3 provides an overview of some embodiments. FIG. 3 provides a visualization for log trace 302 of: process trace decoding 304, identification of the corresponding process model 306 and empirical model 308, animation 312 of the conformance according to the empirical model, and expectedness and frequency behavior diagnostics 314.

Regarding conformance, log trace 304 is shown decoded, together with graphs for its matched process model 306 and empirical model 308, and within its corresponding empirical model by highlighting the common and uncommon transitions. The graph of empirical model 308 can be tuned using slider 310 such that only the transitions within a range of interest to the user are displayed. Thus, slider 310 allows filtering noise.

Regarding diagnostics, embodiments can provide path expectedness and path frequency parameters. In general, expectedness can be characterized as one of "expected" and "unexpected", or quantitatively. Further, in general, frequency can be characterized as "common", "average", and "uncommon", or quantitatively. For computing diagnostics, the user can specify aversion to outliers and noise using radio buttons 316.

The visualization of FIG. 3 can be presented to a user using, e.g., a display on a monitor or a printout. Because the conformance checking 312 and diagnostics 314 can be calculated during the online phase, the visualization depicted in FIG. 3 can also be provided to the user in real time.

Figure 4:
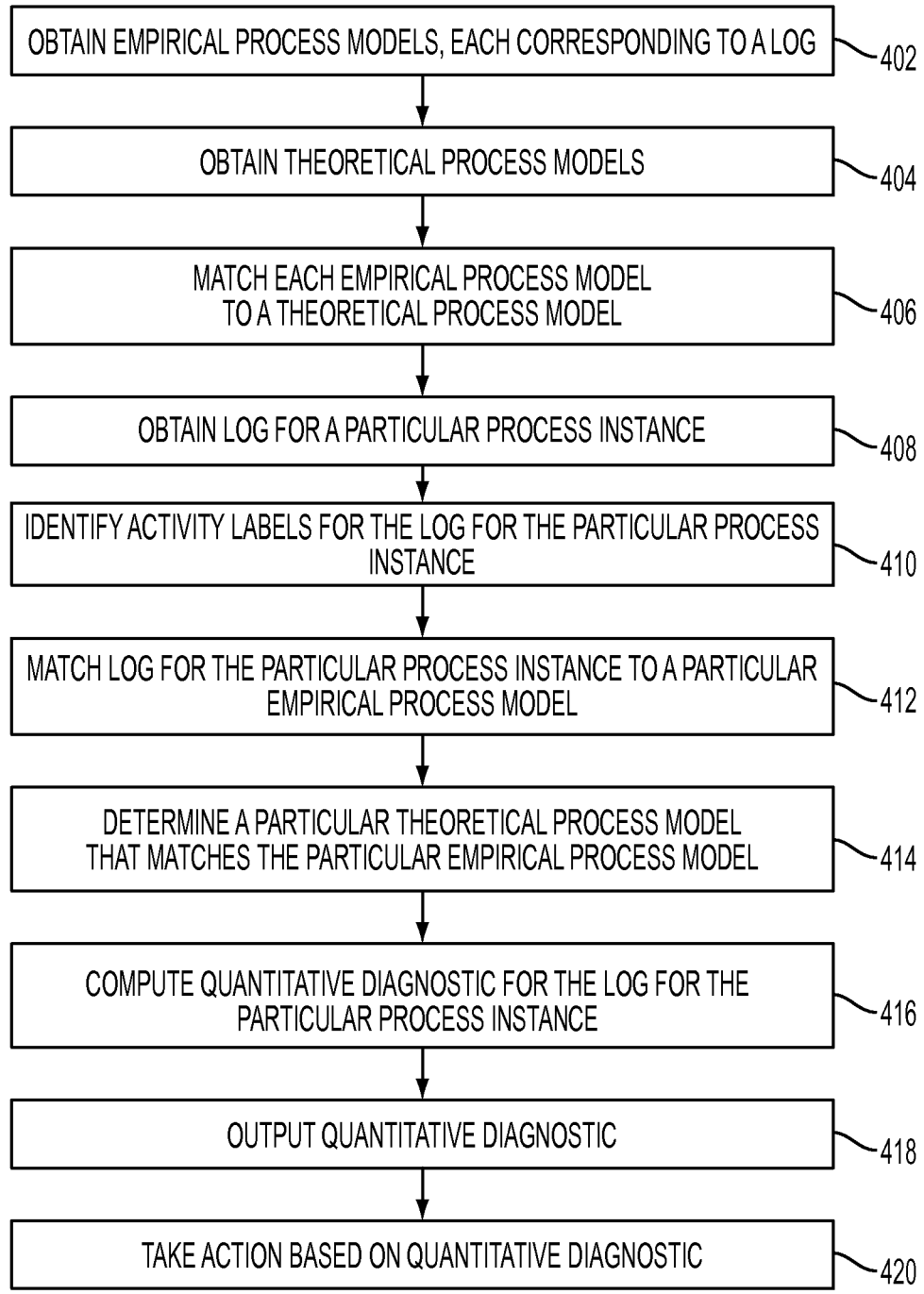
FIG. 4 is a flowchart of a method according to some embodiments.

FIG. 4 is a flowchart of a method according to some embodiments. Thus, FIG. 4 provides a flowchart for the process depicted in overview in FIGS. 2A, 2B and 3. Details of the particular blocks of FIG. 4 are discussed in reference to FIGS. 5-10 herein. Blocks 402, 403 and 404 are generally directed to training an embodiment, and blocks 408-420 are generally directed to obtaining diagnostics for a particular log.

At block 402, the technique obtains empirical process models, each corresponding to a log. The technique can obtain the empirical process models from log traces as discussed above in reference to FIGS. 2A and 2B. The log traces can be provided in electronic form, for example, and the empirical models generated therefrom and stored in electronic form. Log traces can be obtained from, e.g., tables, files, logging systems, BPMS, ERP, CRM, middleware, and/or hospital systems.

At block 404, the technique obtains theoretical process models. The theoretical process models can be obtained from, e.g., an expert, or found in a business process repository. They can be formalized in the BPMN language or any other business process or workflow format. The obtaining can occur by electronic communication, accessing stored data, user identification, etc.

At block 406, the technique associates each process model with its corresponding empirical model. The techniques of this block are discussed in detail below in reference to FIGS. 5 and 6. In particular, the technique of block 406 can proceed as follows. First, the technique of block 406 converts the theoretical process models into transition matrices following the maximum entropy principle, e.g., only the minimal necessary hypotheses are used for calculating the transition values. This process is discussed in detail in reference to FIG. 5. The theoretical process model transition matrices are referred to herein as "theoretical transition matrices". Next, the technique matches the theoretical transition models and the empirical models of block 404. Thus, block 406 can output a table associating each empirical process model with a matching theoretical process model.

At block 408, the technique obtains a log for a particular process instance. The techniques disclosed herein generate diagnostics corresponding to the log obtained at this block. The obtaining can occur by electronic communication, accessing stored data, user identification, etc. This process is discussed in detail in reference to FIG. 6.

At block 410, the technique identifies activity labels for the log. This block can be performed using known techniques, e.g., using the computed CRFs for decoding as discussed in detail in reference to FIG. 7 below.

At block 412, the technique matches the log for the particular process instance to a particular empirical process model. The techniques of this block are discussed in detail in reference to FIG. 7 below.

At block 414, the technique determines the particular theoretical process model that matches the particular empirical process model. The activity of this block can be accomplished by performing a lookup on the table generated at block 406.

At block 416, the technique computes a quantitative diagnostic for the log for the particular process instance. The techniques of this block are discussed in detail in reference to FIGS. 8, 9, and 10, below.

At block 418, the technique outputs the quantitative diagnostic. The output can employ any of a variety of techniques, e.g., displaying on a computer screen, printing, emailing, etc.

At block 420, the technique takes an action based on the quantitative diagnostic. The action can be performed by, e.g., a business user or business analyst. The action can depend on whether the log for the particular process instance conforms to the corresponding theoretical process model or not, as determined by the quantitative diagnostic. If it is conforming, the action can be to validate the model, publish the model, etc. If it is non-conforming, the action can be correction or improving the theoretical process model. The correction or improvement can be, e.g., formally incorporating desirable or undesirable deviations into the model so that the model better fits with empirical reality.

Figure 5:
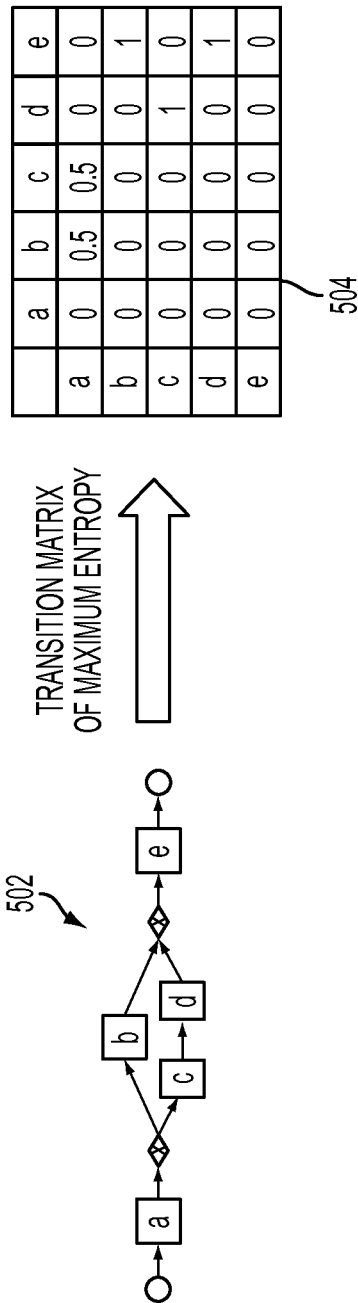
FIG. 5 is a schematic diagram of a technique for generating an matrix of maximum entropy from a process model according to some embodiments.

FIG. 5 is a schematic diagram of a technique for generating a matrix of maximum entropy from a process model according to some embodiments. The technique can be used in conjunction with the technique of FIG. 6 to perform the action of block 406 of FIG. 4. The technique of FIG. 6 can receive as input K empirical transition matrices (of to the K learnt CRF models), as well as K' theoretical process models (K' could equal K if K' is given at the clustering step).

The technique can process as follows. For each theoretical process model, the technique converts the theoretical process model into a transition matrix of maximum entropy, called the "theoretical transition matrix". If each activity in a theoretical process model is considered as a node in the theoretical process graph, and each transition between two activities is considered as an edge, then a transition matrix structure can be obtained by calculating activities' transition values according to the maximum entropy principle. In particular, the following can be used:

If an activity $a_1$ has only one successor $a_2$, its transition value $<a_1,a_2>$ in the theoretical transition matrix is set equal to 1;

If an activity $a_1$ has n parallel successor activities $a_i$ (e.g., through an AND-gateway), the transition values of $<a_1,a_i>$, i∈[1, n], are all set equal to 1;

If an activity $a_1$ has one exclusive successor activity among n possible activities $a_i$ (e.g., through an exclusive XOR-gateway), the transition values of $<a_1,a_i>$, i∈[1, n], will all equal 1/n; and If an activity $a_1$ has one or more successor activities among n possible activities $a_i$ (e.g., through an inclusive OR-gateway, conditional branches), the transition values of $<a_1,a_i>$, i∈[1, n], will all equal 1/n.

Note that in some embodiments, the initial 0 values of the theoretical transition matrix can be replaced by a very small value ε<<1, e.g., 0.000001, in order to avoid paths with null values in the Viterbi decoding step (e.g., block 410 and 412 of FIG. 4).

The above steps are exemplary and non-limiting. Nevertheless, FIG. 5 illustrates an example of this conversion. The process accepts theoretical process model 502, and converts it to a matrix of maximum entropy, that is, theoretical transition matrix 504. This technique is performed for each theoretical process model obtained at block 404 of FIG. 4.

Figure 6:
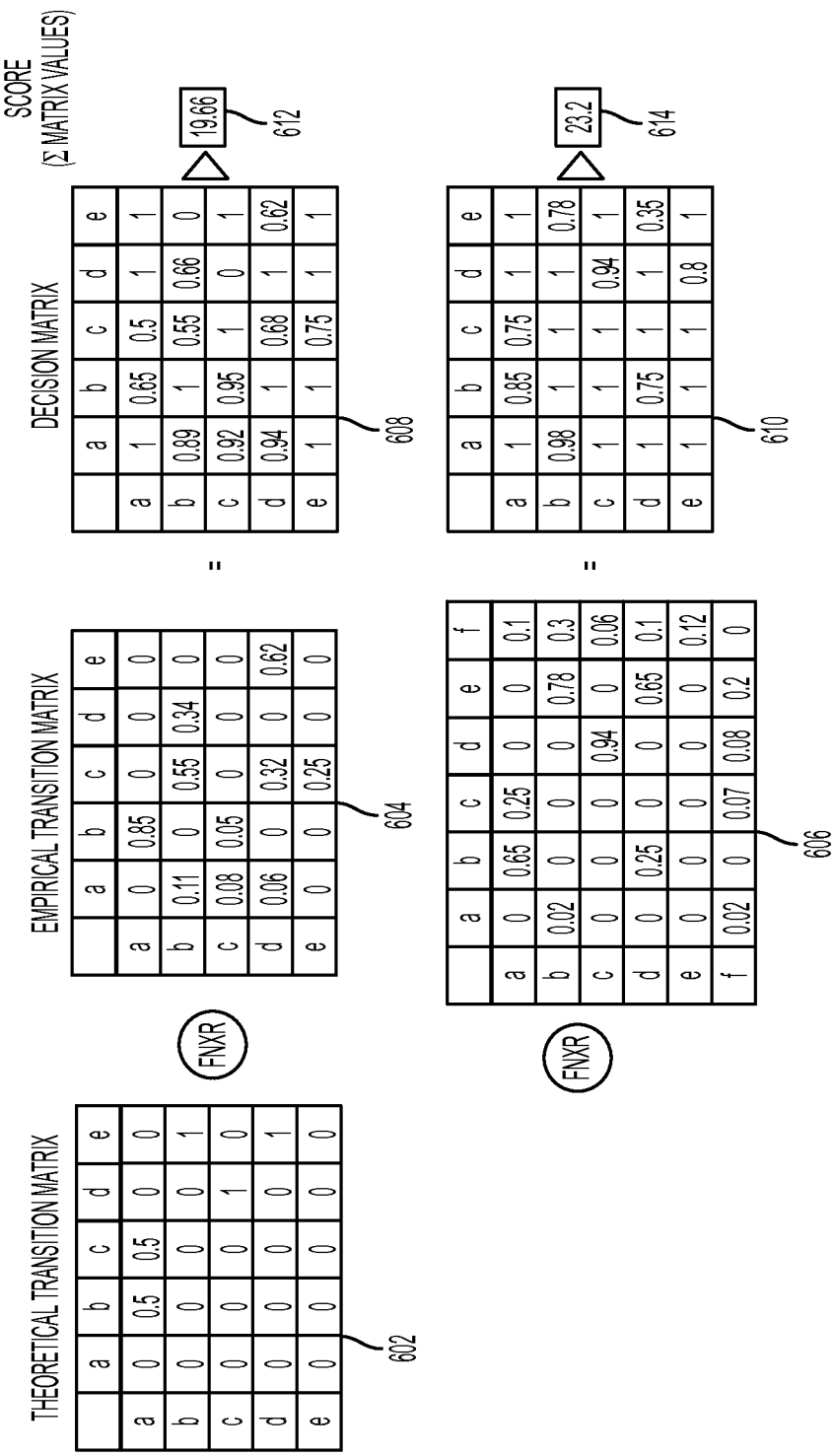
FIG. 6 is a schematic diagram of a technique for computing decision matrix scores according to some embodiments.

FIG. 6 is a schematic diagram of a technique for computing decision matrix scores according to some embodiments. The technique can be used in conjunction with the technique of FIG. 5 to perform the action of block 406 of FIG. 4. In particular, the technique illustrated in reference to FIG. 6 can be used to determine a score for each pair consisting of a theoretical transition matrix and an empirical transition matrix. For a given empirical transition matrix, the theoretical transition matrix that, when paired with the given empirical transition matrix, provides the highest score, is considered a match.

The fuzzy operator Not Xor is used for this purpose as it is very well suited to handle in a linear fashion non-binary values (of the theoretical and empirical transition matrices). Besides, it rewards the existence as well as the inexistence of transitions with similar values in both matrices, and penalizes the differences. The output of the technique of FIG. 6 is a correspondence table, which maps each theoretical process model with its corresponding empirical model.

The technique of FIG. 6 can proceed as follows, for example. If x and y are the transition values in the theoretical and empirical matrices, respectively, their comparison using the Fuzzy Not Xor operator is given by FNXR(x,y)=1−x−y+2 min(x,y). For example, if a transition $<a_1,a_2>$ has the value 1 in the theoretical transition matrix, and 0.85 in the empirical transition matrix, FNXR(1, 0.85)=0.85. Likewise, if $<a_1,a_3>$ has the value 0.000001 in the theoretical matrix and 0.15 in the empirical one, FNXR(0.000001, 0.15)=0.850001. In contrast, if $<a_1,a_4>$ has the value 0.1 in the theoretical matrix and 0.9 in the empirical one, then FNXR(0.1, 0.9)=0.2.

Next, the technique selects the empirical process model with the highest score. The application of the FNXR operator to the theoretical and empirical matrices gives a third matrix called a "decision matrix". The matching score is obtained by summing up all the values in the decision matrix. The highest score determines the empirical model that is the closest to the theoretical one.

Thus, the technique of FIG. 6, when applied to the collection of theoretical process models and empirical process models, generates a correspondence table <process model, empirical model>. Indeed, after performing the previous techniques for all theoretical process models, a correspondence table, which maps each theoretical and thus process model with its corresponding empirical model, is obtained.

As depicted in FIG. 6, the FNXR operator is applied to theoretical transition matrix 602 and empirical transition matrix 604 to yield decision matrix 608 and corresponding score 612. Similarly, the FNXR operator is applied to theoretical transition matrix 602 and empirical transition matrix 606 to yield decision matrix 610 and corresponding score 614. From among empirical transition matrices 604, 606, the highest score is score 614. Accordingly, empirical transition matrix 606 is said to match theoretical transition matrix 602.

Figure 7:
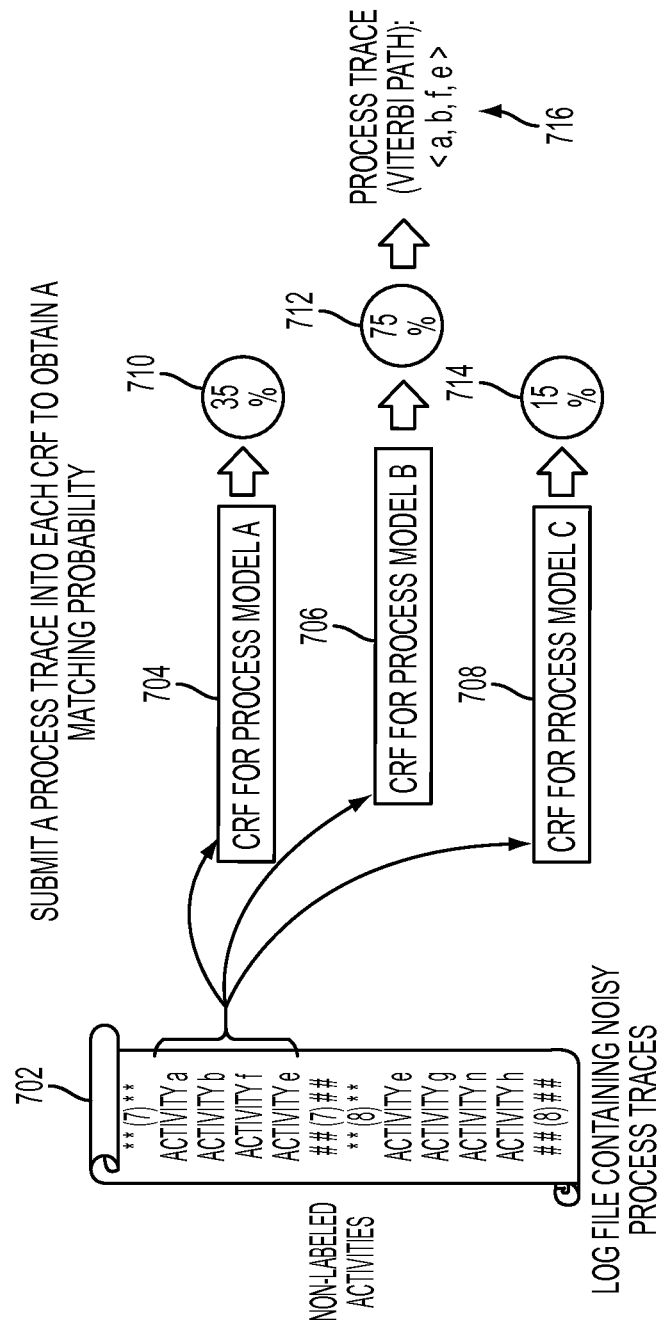
FIG. 7 is a schematic diagram of a technique for decoding a process trace according to some embodiments.

FIG. 7 is a schematic diagram of a technique for decoding a process trace according to some embodiments. The technique can be used to perform the action of blocks 410 and 412 of FIG. 4. Thus, once each process model has been mapped to its corresponding theoretical and empirical representations, conformance checking and diagnostic can be operated in real time on any incoming process trace. In order to do so, the technique takes an incoming process trace where activities are not labeled and decodes the process trace, i.e. identifies its activities' labels (e.g., the Viterbi path) and the empirical model (and therefore the theoretical process model) that generated it.

The technique of FIG. 7 accepts as an input new incoming noisy process trace 702 generated by an instance of an unknown process and a correspondence table of the form <process model, empirical model>, e.g., generated by block 406 of FIG. 4. Activities of process trace 702 may not be labeled. Thus, the technique decodes process trace 702. This can be accomplished according to known techniques.

Alternately, decoding process trace 702 can be accomplished according to the techniques disclosed and claimed in U.S. patent application Ser. No. 14/081,203, entitled, "A METHOD AND SYSTEM FOR CLUSTERING, MODELING, AND VISUALIZING PROCESS MODELS FROM NOISY LOGS" to Charif et al., filed Nov. 15, 2013 and corresponding to Xerox invention. To summarize the process, it includes decoding incoming trace 702 with respect to each CRF empirical model 70-4, 706, 708 learnt (e.g., block 406 of FIG. 4) during the offline phase using the Viterbi algorithm. As an output, the technique provides: a) the labels 716 of the activities of the given trace, b) the empirical process model that generated the trace (i.e. which is the CRF model 704, 706, or 708 that showed the highest likelihood score 710, 712, 714 during the decoding). The process trace is thus conformed to both the process and empirical models.

Figure 8:
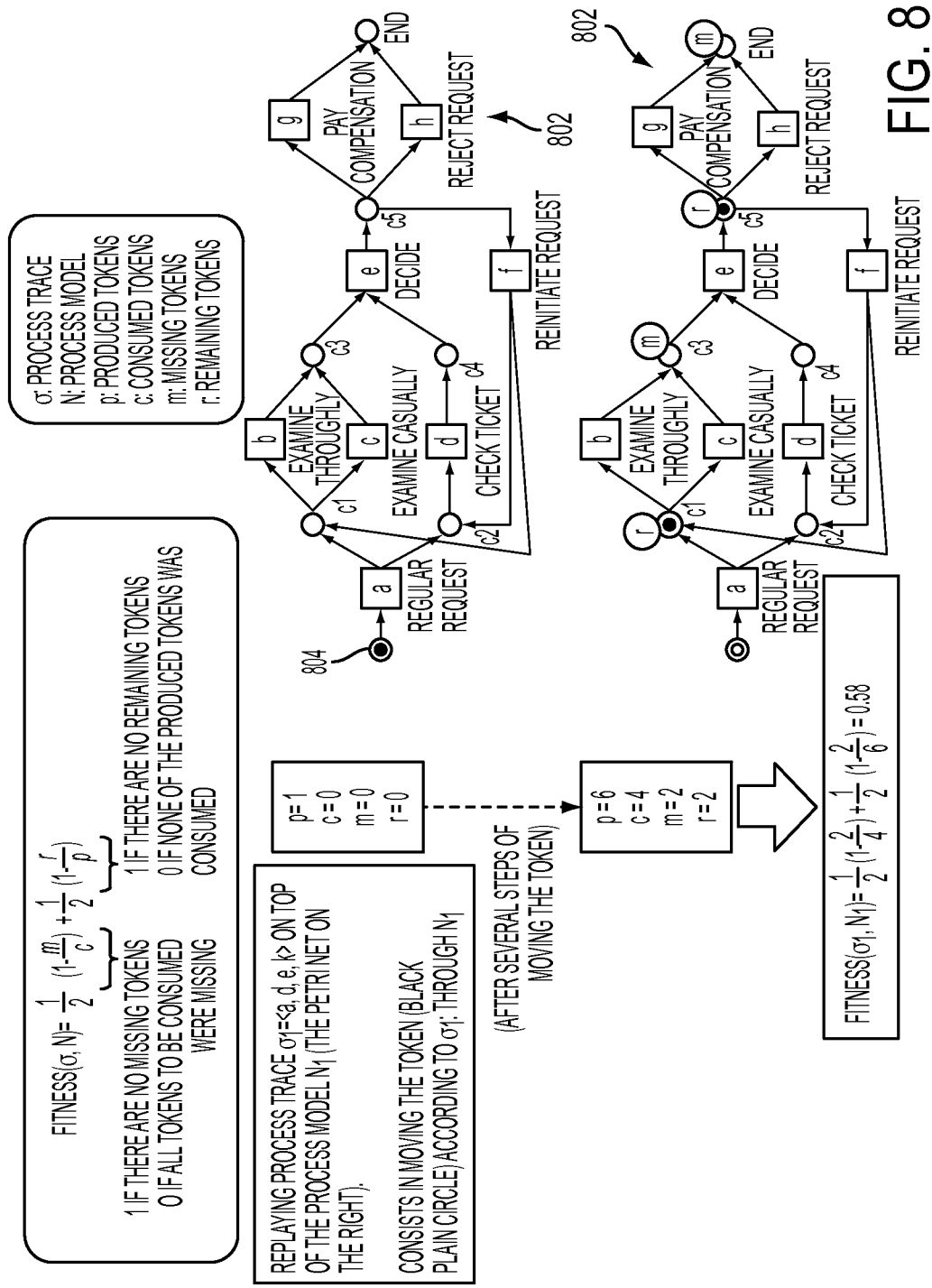
FIG. 8 is a schematic diagram of a technique for calculating a fitness score according to some embodiments.

FIG. 8 is a schematic diagram of a technique for calculating a fitness score according to some embodiments. The fitness score can then be used to calculate various diagnostics, including trace expectedness. The technique of FIG. 8 can thus be used to perform a portion of block 418 of FIG. 4. The fitness score can be calculated using known techniques, e.g., those disclosed in section 7.2 of Wil M. P. Van der Aalst, *Process Mining: Discovery, Conformance, and Enhancement of Business Processes*, Springer-Verlag Berlin Heidelberg, 2011.

As depicted in FIG. 8, the fitness parameter can be calculated according to, by way of non-limiting example:

$$\text{Fitness}(\sigma, N) = \frac{1}{2}\left(1 - \frac{m}{c}\right) + \frac{1}{2}\left(1 - \frac{r}{p}\right) \quad \text{(Equation 1)}$$

In Equation 1, Fitness($\sigma$, N) represents the fitness score for process trace $\sigma$ and process model N, where N is represented as a Petri net, where p represents produced tokens, c represents consumed tokens, m represents missing tokens, and r represents remaining tokens as discovered according to moving token 804 through, e.g., process trace $\sigma1$=<a, d, e, k> as depicted in FIG. 8.

The process of FIG. 8 can thus include assessing the process trace expectedness through the calculation of a conformance checking metric (e.g. fitness) with respect to the corresponding process model. Note that in contrast to techniques in which conformance checking metrics are used to measure the fitting degree of a process trace to a process model, the technique disclosed herein employs conformance checking metrics as a measure of behavior expectedness. In some embodiments, the trace behavior is expected if the fitness is equal to one, otherwise it is unexpected. This is because the conformed process model is not random, but rather the one that has been already identified as corresponding to the process trace.

Figure 9:
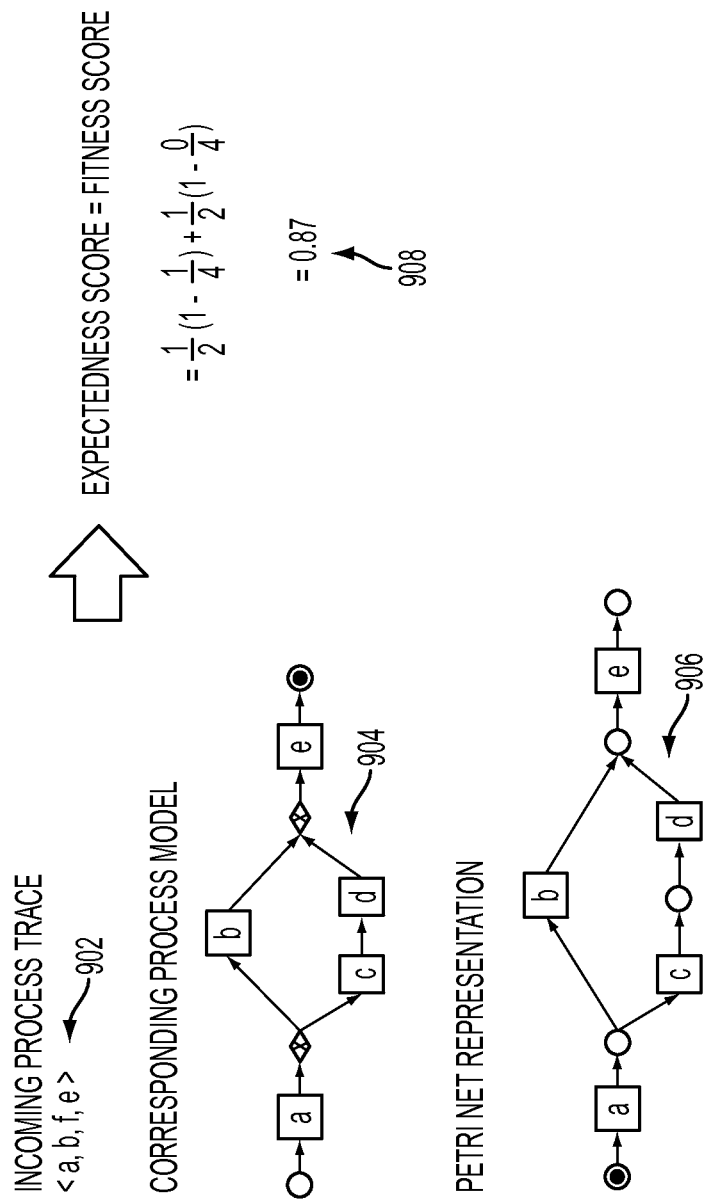
FIG. 9 is a schematic diagram of a technique for calculating a process trace expectedness according to some embodiments.

FIG. 9 is a schematic diagram of a technique for calculating a process trace expectedness according to some embodiments. The technique of FIG. 9 can be used to perform a portion of block 418 of FIG. 4. The technique accepts incoming process trace 902 corresponding to process model 904 with a Petri net representation 906, and outputs expectedness score 908, which is a fitness score, e.g., as discussed above in reference to FIG. 8. The behavior expectedness parameter can be expressed as one of two values, namely, the trace belongs to an expected path of the process model, if fitness=1, and the trace belongs to an unexpected path of the process model, if fitness<1. As shown in FIG. 9, because expectedness score 908 is 0.87<1, process trace 902 is unexpected.

Figure 10:
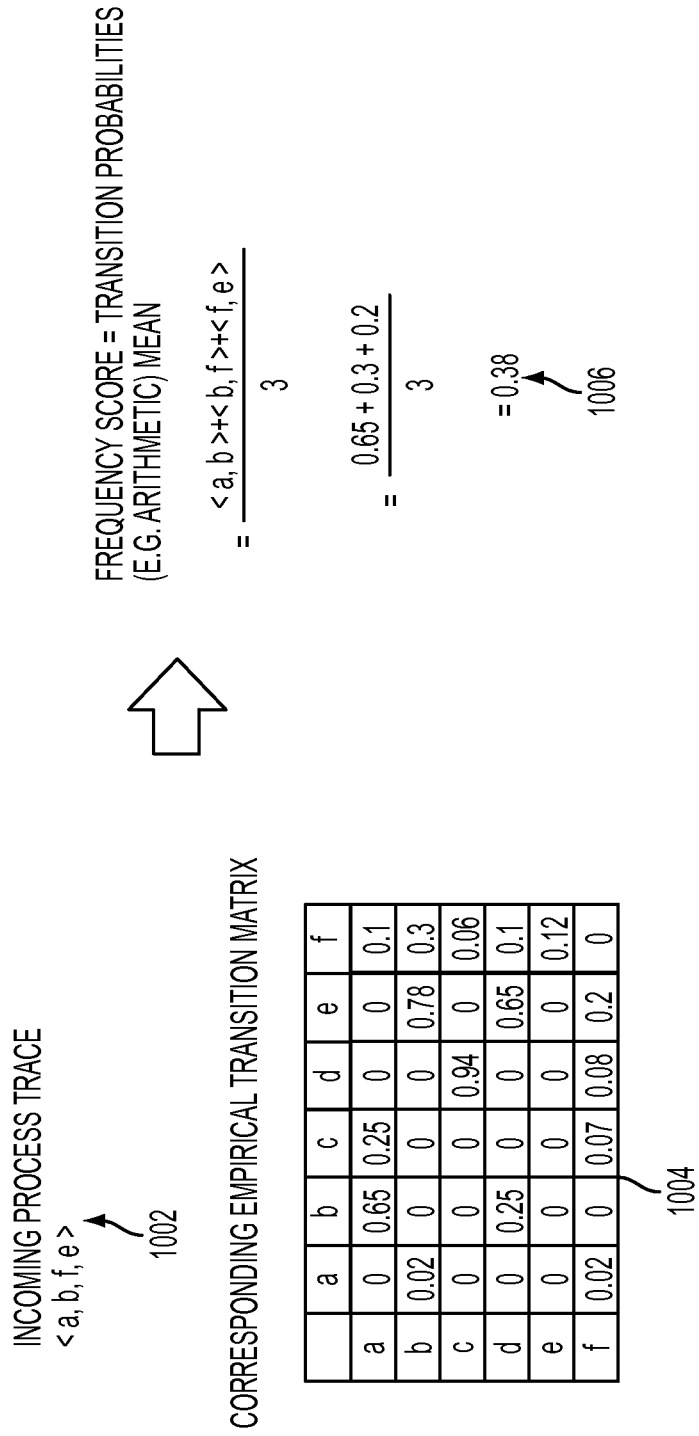
FIG. 10 is a schematic diagram of a technique for calculating a process trace frequency according to some embodiments.

FIG. 10 is a schematic diagram of a technique for calculating a process trace frequency according to some embodiments. The technique of FIG. 10 can be used to perform a portion of block 418 of FIG. 4. The frequency diagnostic can be calculated by determining the mean of the Viterbi path transition probabilities given by the empirical model.

The technique of FIG. 10 accepts incoming process trace 1002 corresponding to empirical transition matrix 1004. Given the computation of the Viterbi path in the CRF model identified as discussed above in reference to FIG. 7, behavior frequency 1006 is assessed by calculating the mean of the activity transition probabilities of the decoded trace. Qualitatively, the behavior frequency parameter can be given as one of three values, namely, "common", if Viterbi path mean$\epsilon$[0.66, 1], "average", if Viterbi path mean$\epsilon$[0.33, 0.66[, and "uncommon", if Viterbi path mean$\epsilon$[0, 0.33[. For the example, depicted in FIG. 10, because frequency 1006 is determined to be 0.38, process trace 1002 can be characterized as "average".

Certain embodiments described above can be performed in part using a computer application or program. The computer program can exist in a variety of forms, both active and inactive. For example, the computer program can exist as one or more software programs, software modules, or both, that can be comprised of program instructions in source code, object code, executable code or other formats, firmware program(s), or hardware description language (HDL) files. Any of the above can be embodied on a computer readable medium, which can include computer readable storage devices and media in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A computer-implemented method for business process behavior conformance checking, the method comprising:
    obtaining a plurality of electronically-stored empirical process models, each empirical process model reflecting at least one of a plurality of logs;
    obtaining a plurality of electronically-stored theoretical process models;

matching each empirical process model to a theoretical process model, wherein the matching comprises:
  generating an empirical transition matrix for each empirical process model;
  generating a theoretical transition matrix for each theoretical process model; and
  determining a decision matrix for each pair consisting of an empirical transition matrix and a theoretical transition matrix, wherein the determining a decision matrix comprises calculating a plurality of fuzzy NOT XOR values;
obtaining a log for a particular process instance, wherein activities in the log for the particular process instance are unlabeled;
identifying activity labels for the particular process instance;
matching the log for the particular process instance to a particular empirical process;
determining a particular theoretical process model that matches the particular empirical process model;
computing, using at least one of the particular empirical process model and the particular theoretical process model, a diagnostic for the log for the particular process instance using an electronic processor; and
outputting in human readable form the diagnostic.

2. The method of claim 1, wherein the diagnostic comprises at least one of a behavior expectedness and a behavior frequency.

3. The method of claim 2, wherein the behavior expectedness comprises a fitness score.

4. The method of claim 2, wherein the behavior frequency comprises a mean of transition probabilities.

5. The method of claim 2, wherein the diagnostic comprises a qualitative diagnostic.

6. The method of claim 1, further comprising taking an action based on the quantitative diagnostic, wherein the action comprises at least one of: validating the particular theoretical process model, publishing the particular theoretical process model, correcting the particular theoretical process model, and improving the particular theoretical process model.

7. The method of claim 1, further comprising computing a score for each decision matrix, wherein the matching each empirical process model to a theoretical process model comprises determining, for each empirical process model, a theoretical process model for which an associated decision matrix has a highest score.

8. The method of claim 1, wherein the obtaining a plurality of electronically stored empirical process models, each empirical process model reflecting at least one of a plurality of logs comprises:
  obtaining logs for the plurality of process instances; and
  generating a plurality of empirical process models from the logs.

9. A system comprising at least one electronic processor configured to:
  obtain a plurality of electronically-stored empirical process models, each empirical process model reflecting at least one of a plurality of logs;
  obtain a plurality of electronically-stored theoretical process models;
  match each empirical process model to a theoretical process model by:
    generating an empirical transition matrix for each empirical process model;
    generating a theoretical transition matrix for each theoretical process model; and
    determining a decision matrix for each pair consisting of an empirical transition matrix and a theoretical transition matrix by calculating a plurality of fuzzy NOT XOR values;
  obtain a log for a particular process instance, wherein activities in the log for the particular process instance are unlabeled;
  identify activity labels for the particular process instance;
  match the log for the particular process instance to a particular empirical process model;
  determine a particular theoretical process model that matches the particular empirical process model;
  compute, using at least one of the particular empirical process model and the particular theoretical process model, a diagnostic for the log for the particular process instance using an electronic processor; and
  output in human readable form the diagnostic.

10. The system of claim 9, wherein the diagnostic comprises at least one of a behavior expectedness and a behavior frequency.

11. The system of claim 10, wherein the behavior expectedness comprises a fitness score.

12. The system of claim 10, wherein the behavior frequency comprises a mean of transition probabilities.

13. The system of claim 10, wherein the diagnostic comprises a qualitative diagnostic.

14. The system of claim 9, wherein the at least one electronic processor is further configured to take an action based on the quantitative diagnostic, wherein the action comprises at least one of: validating the particular theoretical process model, publishing the particular theoretical process model, correcting the particular theoretical process model, and improving the particular theoretical process model.

15. The system of claim 9, wherein the at least one electronic processor is further configured to compute a score for each decision matrix, and determine, for each empirical process model, a theoretical process model for which an associated decision matrix has a highest score.

16. The system of claim 9, wherein the at least one electronic processor configured to obtain a plurality of empirical process models, each empirical process model reflecting at least one of a plurality of log, is further configured to:
  obtain logs for the plurality of process instances; and
  generate a plurality of empirical process models from the logs.

17. Nontransitory computer readable media containing instructions, which, when executed by at least one electronic processor, cause the at least one electronic processor to:
  obtain a plurality of electronically-stored empirical process models, each empirical process model reflecting at least one of a plurality of logs;
  obtain a plurality of electronically-stored theoretical process models;
  match each empirical process model to a theoretical process model by:
    generating an empirical transition matrix for each empirical process model;
    generating a theoretical transition matrix for each theoretical process model; and
    determining a decision matrix for each pair consisting of an empirical transition matrix and a theoretical transition matrix by calculating a plurality of fuzzy NOT XOR values;

obtain a log for a particular process instance, wherein activities in the log for the particular process instance are unlabeled;
identify activity labels for the particular process instance;
match the log for the particular process instance to a particular empirical process model;
determine a particular theoretical process model that matches the particular empirical process model;
compute, using at least one of the particular empirical process model and the particular theoretical process model, a diagnostic for the log for the particular process instance using an electronic processor; and
output in human readable form the diagnostic.

* * * * *